United States Patent
Campbell

[15] 3,655,977
[45] Apr. 11, 1972

[54] RADIATION EMISSION AND DETECTION APPARATUS FOR DETERMINING DENSITY OF A MATERIAL

[72] Inventor: Patrick J. Campbell, 124 Brichanan Circle, Pacheco, Calif. 94553

[22] Filed: Apr. 2, 1969

[21] Appl. No.: 812,619

[52] U.S. Cl. .......................250/83.6 S, 250/83.1, 250/106 R
[51] Int. Cl. .......................................................G01n 23/06
[58] Field of Search ..............250/83.1, 83.6 S, 106 S, 83.3 D

[56] References Cited

UNITED STATES PATENTS

| | | | |
|---|---|---|---|
| 2,998,527 | 8/1961 | Shevick et al. | 250/106 S |
| 3,213,280 | 10/1965 | Burley et al. | 250/43.5 D |
| 3,229,092 | 1/1966 | Eberline | 250/83.1 |

FOREIGN PATENTS OR APPLICATIONS 863,886  3/1961  Great Britain.....................250/83.6 S

*Primary Examiner*—Archie R. Borchelt
*Attorney*—Gardner & Zimmerman

[57] ABSTRACT

Apparatus is described which is capable of determining characteristics of a volume of material by both measuring (a) the amount of radiation emitted by a radioactive source transmitted a predetermined distance through the material and by measuring (b) the amount of radiation from a source reflected by the material. The apparatus includes an exterior housing having contained therein at a predetermined location adjacent its bottom wall a radiation shielded container for a radioactive source. The container has a radiation transparent opening through which radiation from the radioactive source is emittable in a predetermined direction, and a shutter arrangement is provided for selectively blocking and freeing the opening. A detector of radiation is contained within an end section of an elongated rod which may be releasably secured to the housing at a first location, shielded from the source container opening, at which the detector will detect substantially only radiation which is reflected toward the detector, and at a second location at which the detector depends downwardly below the bottom wall of the housing in direct line-of-sight to the opening for the detection of radiation emitted from the opening and transmitted a predetermined distance through the material located between the opening and the detector.

6 Claims, 7 Drawing Figures

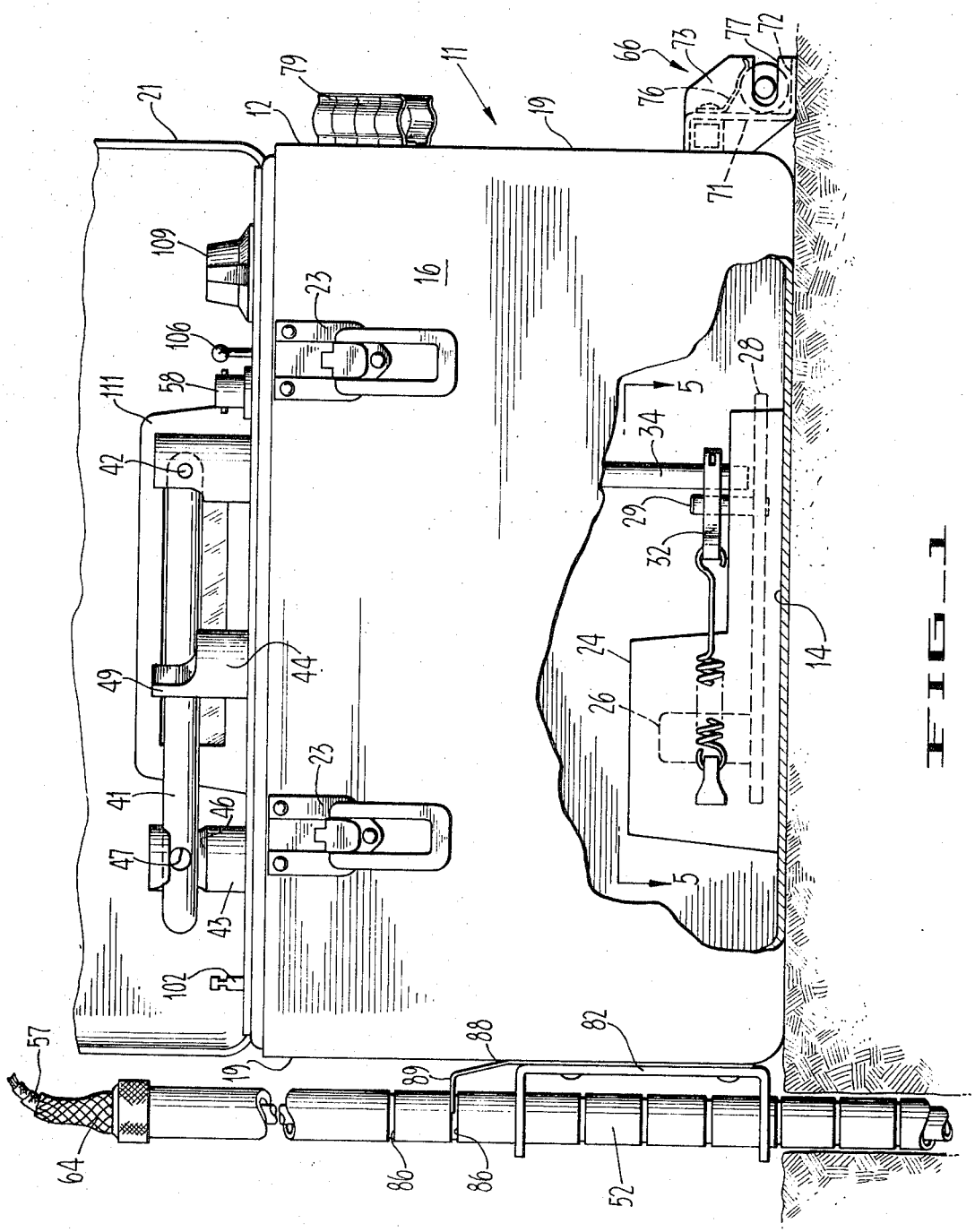
FIG_1
INVENTOR.
Patrick J. Campbell

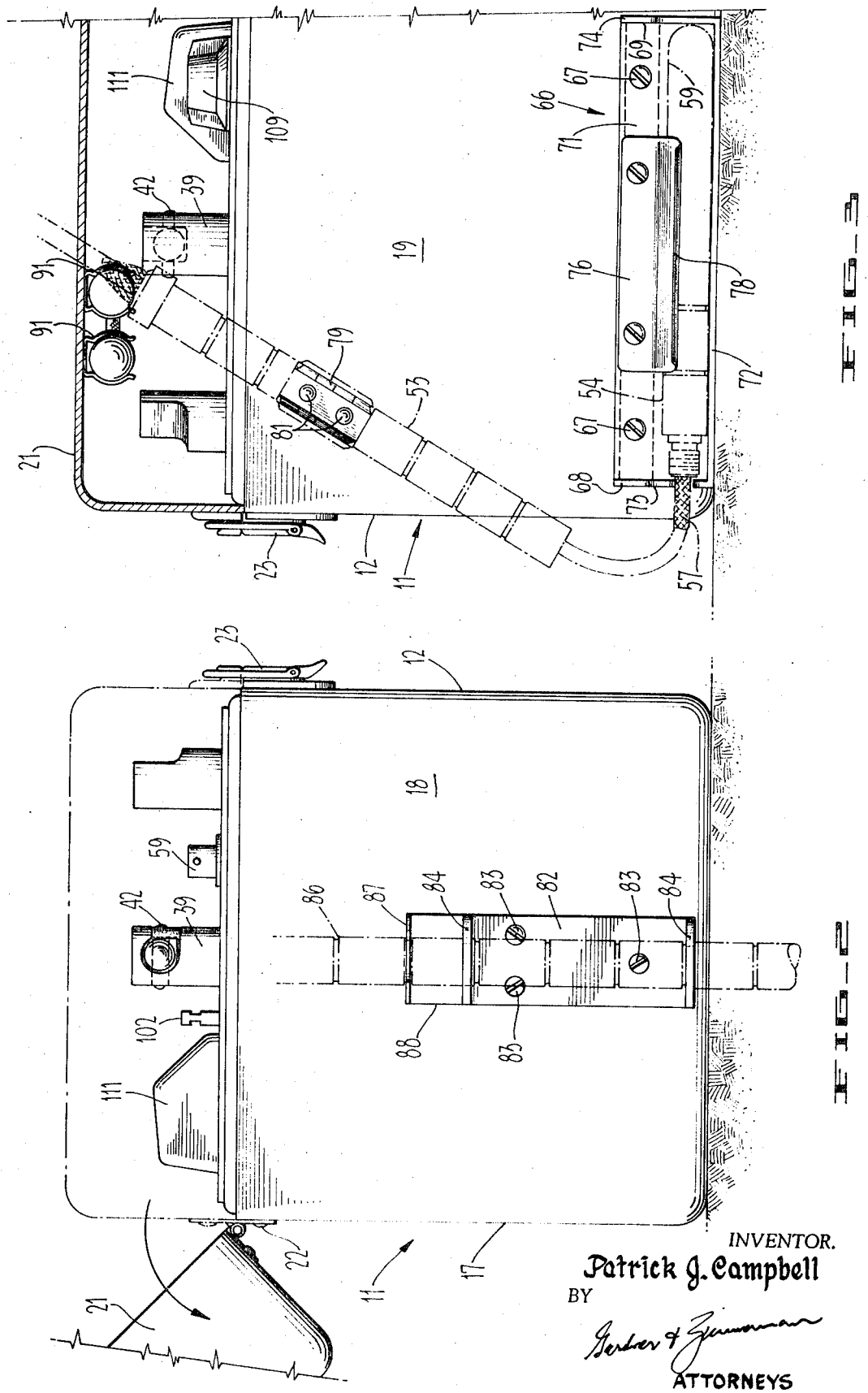

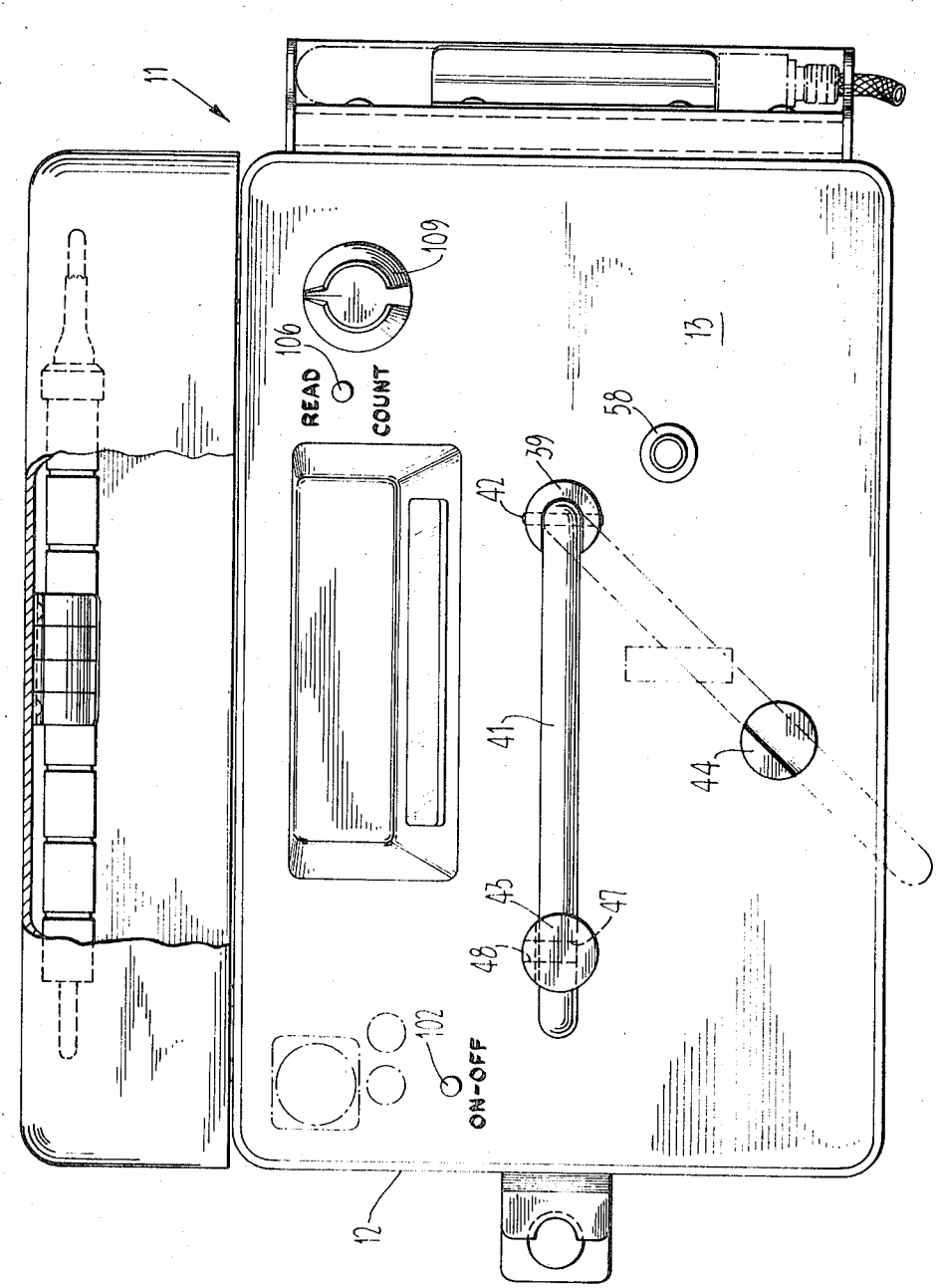

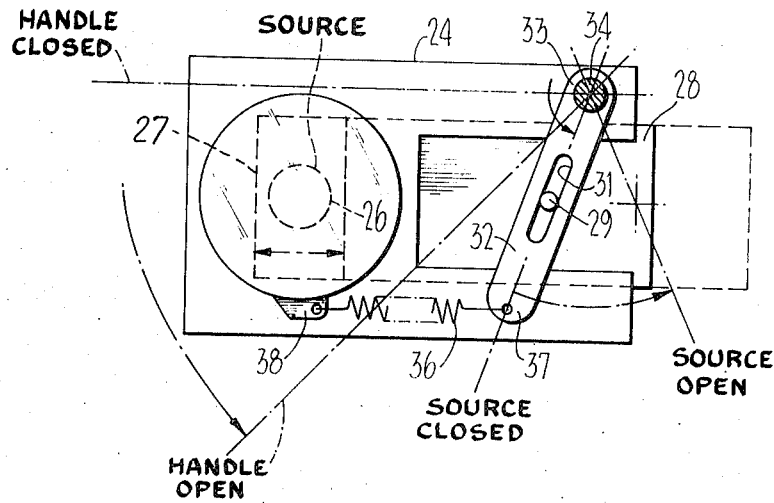
FIG_5
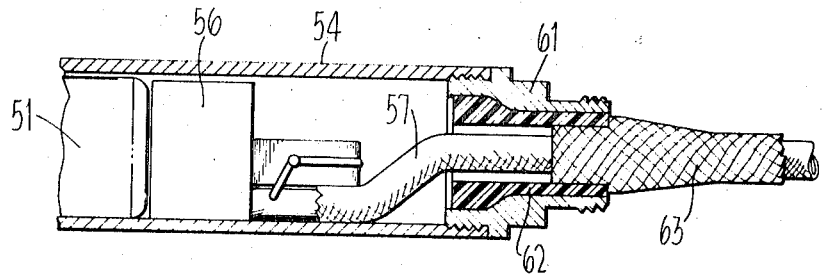
FIG_6
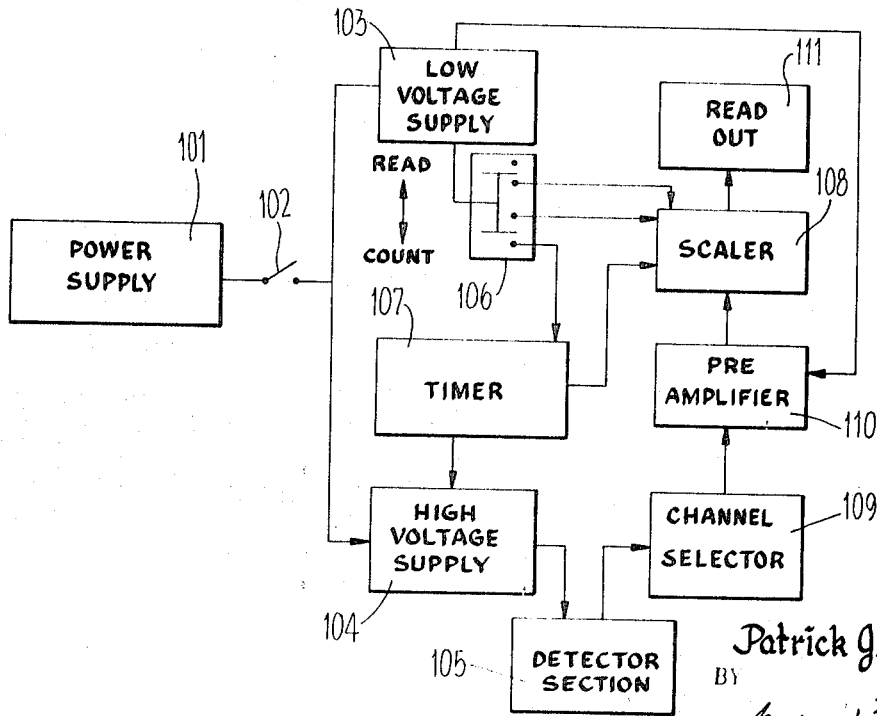
FIG_7

3,655,977

RADIATION EMISSION AND DETECTION APPARATUS FOR DETERMINING DENSITY OF A MATERIAL

The present invention relates to an apparatus for measuring the characteristics of a volume of material and, more particularly, to such an apparatus which can be used to measure such characteristics by either (a) the direct transmission of radiation emitted by a radioactive source through a portion of the material or (b) the reflection from the material of radiation emitted by the source, and which is simply and safely converted from either of the modes of operation to the other.

Nuclear and electromagnetic radiation is finding increasing use in the measurement and identification of certain characteristics of materials. For example, radiation from a radioactive source is utilized in the construction industry to determine the density and moisture content of a soil or other material. The density of the material can be determined by measuring the amount of high energy gamma radiation which is reflected from the surface of the material, or absorbed during passage of the radiation a predetermined distance through the material. The moisture or hydrogenous content in a material can be determined by the number of fast neutrons from a fast neutron source which are slowed to thermal speed by the hydrogen in the material.

There are basically two techniques by which radiation is utilized to measure the characteristics of a material. One, the "direct transmission" method, relies upon the detection of the amount of radiation which passes a predetermined distance through a volume of the material located between a radioactive source and the detecting unit. This measurement technique provides a quite accurate reading indicative of the characteristic being measured. However, in many applications it requires some destruction of the material. For example, in the measurement of the density of a road base, it is generally necessary to bore a hole of the like into the base and insert a radioactive source into the hole at a prescribed depth. The amount of radiation from the source passing upwardly through the material to the surface is detected by detection means located at the surface. In some instances, such as when the road base is exceptionally hard or of rock, it is undesirable or impractical to drill a hole. Then it is necessary to utilize the "back scatter" technique to measure the characteristics of the base. In this technique, a source and radiation detector are both placed on the surface of the road base at locations at which they are radiation shielded from one another. Then the detector detects the radiation which is reflected from the surface layer of the base to provide a reading indicative of the base density near its surface.

Apparatuses have been especially designed for measuring the density or moisture content of the material. Some of these apparatuses utilize the direct transmission technique and others the back scatter technique. While there are several apparatuses available which are capable of measuring the characteristics by either one of the techniques, these apparatuses are generally complicated and often require handling of the source to convert the apparatus from one of the measuring modes to the other. Because of the danger inherent in the handling of a radioactive source and the complicated nature of these apparatuses, they generally have not received widespread acceptance, and many people have been deterred from using radiation techniques for making density and moisture measurements.

SUMMARY OF THE INVENTION

The instant invention provides apparatus capable of determining characteristics of a volume of material by either direct transmission through or, back scatter from the material of radiation, which apparatus is simply and safely converted from use under one technique to the other. Moreover, the apparatus is quite compact and easily ported from one location to another. In its basic aspects, the apparatus comprises an exterior housing having located within it at a predetermined location a container for a radioactive source. The container includes a radiation transparent opening through which radiation from a source will emit in a predetermined direction toward the material whose characteristics are to be measured. Means are provided for selectively closing the opening to the passage of radiation in order to completely shield the radioactive source when the apparatus is not in use. The apparatus also includes a detector of radiation which is securable at two different locations relative to the apparatus housing. At a first one of the locations, the detector is shielded from the container opening so that direct, line-of-sight radiation from a radioactive source within the container is prevented from reaching the detector. Such radiation can only reach the detector by reflection, such as by back scattering from the material whose characteristics are to be measured. At the second location, the detector is spaced from the opening and in direct line-of-sight therewith so that the detector will directly receive radiation emitted from such opening and passing a predetermined distance through a volume of the material located between the source and the detector. The apparatus also includes as an integral part thereof indicating means for selectively registering the amount of radiation detected by the detector at each of the locations.

Desirably, the detector is contained within an elongated rod adjacent an end thereof, and the means for securing the detector relative to the housing at the first location is a bracket which will maintain the end section of the rod containing the detector laterally adjacent the container and generally parallel to its bottom wall, and the means for securing the detector at the second location will do so with the end of the rod containing the detector depending downwardly below the bottom wall of the housing to directly receive radiation passing through such bottom wall.

It will be appreciated that with this arrangement, the radioactive source is maintained at one location within the housing for both operating modes and, therefore, need not be handled to convert the apparatus from one mode to another. It is only necessary to simply move the detector from one of its predetermined locations to its other. Moreover, because the readout mechanism is contained within the housing, the apparatus provides a compact one-piece unit capable of providing the measurements by both of the techniques. Other advantages and features of the apparatus will become apparent from the detailed description of a preferred embodiment following hereinafter.

BRIEF DESCRIPTION OF THE DRAWINGS

FIG. 1 is a side elevational view of a preferred embodiment of the apparatus of the invention with the upper portion of the cover removed and the housing broken away to illustrate a portion of the interior construction of the apparatus;

FIG. 2 is an elevational view of preferred embodiment of FIG. 1 and illustrating the means for securing the detector at one predetermined location relative to the housing;

FIG. 3 is an end elevation of the end of the apparatus opposite to that illustrated in FIG. 2 and depicting the means for securing the detector in a second predetermined location relative to the housing;

FIG. 4 is a top plan view of the apparatus of FIG. 1 with a portion of the cover thereof broken away;

FIG. 5 is a view taken on a plane indicated by the lines 5—5 of FIG. 1 and illustrating the container and shutter arrangement for the radioactive source;

FIG. 6 is an enlarged partial view of the end section of the detector rod illustrating a strain relief weave for the lead cable; and FIG. 7 is a block diagram of the detection registering circuit incorporated into the housing.

DESCRIPTION OF THE PREFERRED EMBODIMENT

A preferred embodiment of the apparatus of the invention is generally referred to in the drawings by the reference numeral 11. Apparatus 11 includes a generally rectangular housing 12 which incorporates all of the operating mechanism of the invention except for the means for detecting radiation. As shown, housing 12 includes a top wall 13, bottom wall 14, front and rear walls 16 and 17, respectively, and opposite side walls 18 and 19. A cover 21 is hingedly secured by hinges 22 adjacent the top edge of rear wall 17 for pivotal movement between the open position illustrated in solid lines in FIG. 2 and the closed position illustrated in solid lines in FIG. 3. As shown, conventional clasps 23 are provided adjacent the upper edge of housing front wall 12 for securing the cover in the closed position.

Apparatus 11 includes means for securely locating a radioactive source at a predetermined location within housing 12. More particularly, a radiation shielding container 24 is secured within housing 12 adjacent the bottom wall 14 thereof. Container 24 is desirably formed as a block of radiation shielding material, such as lead, having a cavity 26 for the reception of a radioactive source. As illustrated, a radiation transparent opening 27 is provided to cavity 26 adjacent the bottom wall 14 of the housing. It will be appreciated that with this arrangement, whenever a source is located within cavity 26 and the opening 27 is free, radiation will be emitted through the opening. Opening 27 acts to collimate the radiation and direct it downward through the bottom wall of the housing.

Means are provided for selectively closing the opening 27 so that the source is within a completely shielded container whenever the apparatus is not in use. The closing arrangement includes a shutter 28 which is slidably received within grooves extending longitudinally of the container for movement between the solid line position illustrated in FIG. 5 closing opening 27 and the dotted line position illustrated in such figure free of such opening. Shutter 28 is similar to container 24 in that it is also a radiation absorbing or shielding material such as lead.

Means are provided for normally maintaining shutter 28 in the closed position but allowing it to be selectively moved to the open position. In this connection, a pin 29 extending vertically upward from shutter 28 rides within a slot 31 in a crank arm 32 having one end 33 pivotally secured to container 24 by a vertically extending rod 34. A strong tension spring 36 secured between the other end 37 of arm 32 and an ear 38 extending outwardly from container 24 adjacent the cavity 26 normally resiliently urges arm 32 to the pivoted position shown in solid lines in FIG. 5. In such position, arm 32 will maintain shutter 28 in the closed position due to the interaction of the arm slot 31 and the pin 29 secured to the shutter.

Pivot rod 34 extends upwardly from container 24 through the top wall 13 of the housing and terminates at its upper end in a boss 39. A handle 41 is pivotally secured by means of a pin 42 to boss 39 for vertical pivotal movements about a horizontal axis. Handle 41 is movable between the horizontal positions shown in full and dotted lines in FIG. 4 to thereby pivot rod 34 about its own axis and thus pivot crank arm 32 between the shutter opening and closed positions.

Stop means are provided for maintaining handle 41 in either of the two positions illustrated. Stop blocks 43 and 44 project upwardly from top wall 13 of housing 12 for this purpose. As illustrated, handle 41 has a generally cylindrical exterior surface, and stop lock 43, which is positioned on housing top wall 13 to maintain handle 41 in the "shutter closed" position, has a semicylindrical recess 46 in its side for the reception of the handle. Registering bores 47 and 48 in handle 41 and block 43, respectively, provide means for the passage of a lock or the like to assure that handle 41 stays in engagement with block 43 and thereby maintains the shutter closed so that accidental opening thereof and consequent exposure to radiation is obviated.

Stop block 44 is positioned on wall 13 to engage handle 41 when the same is in the "shutter open" position. Block 44 includes an upwardly extending detent 49 for such engagement with the handle and to maintain the same in the open position against the tension of spring 36. As illustrated, block 44 is free of structure above detent 49 which would prevent handle 41 from being pivoted upward about pin 42. This assures that the apparatus is not moved unintentionally when the shutter is in the open position. That is, if one should grasp handle 41 to lift the apparatus when the handle 41 is in engagement with stop 44, the handle will be pivoted upwardly beyond detent 49 and the tension spring 36 will then tend to pivot crank arm 32 in the shutter 28 closing direction. Due to the connection of handle 41 to arm 32 by rod 34, handle 41 will also be pivoted toward block 43. This will indicate to whomever is attempting to lift the apparatus by handle 41 that he did so with the shutter in the open position.

The radiation detector of the apparatus can be of any suitable type, depending upon the radiation to be measured. For example, for the measurement of soil density with gamma radiation, the detector can be a Geiger-Meuller tube such as that partly shown and indicated by the reference numeral 51 in FIG. 6. Such detect is enclosed within an elongated detector rod 52. As illustrated, rod 52 is made up of two sections 53 and 54 which are threadably secured together. Tube 51 is contained within the end section 54 and is electrically connected by means of a suitable plug 56 to a coaxial lead cable 57 which extends through the rod 52 and is suitable electrically connected to electronic readout mechanism within housing 11 such as by means of jack 58 on the housing top wall 13. End section 54 of rod 52 has a rounded nose end 59 which facilitates the insertion of such rod into a bore hole in soil or other material whose characteristics are to be measured. As illustrated in FIG. 6, the other end of end section 54 is closed by a cap 61 having a central bore through which cable 57 extends. An annular plastic insert 62 within the bore of cap 61 circumscribes cable 57 and has encapsulated therein one end of a strain relief wire weave sleeve 63. Sleeve 63 extends outward of end section 54 coaxially with the cable 57. Upon an external force on the cable 57 tending to pull the same outwardly from the end section, sleeve 63 will be elongated and contract into tight engagement with the cable and act to transmit the outward force on such cable directly to the end section. This arrangement will prevent any unintentional force on sleeve 57 tending to separate it from plug 56 from doing so. As shown in FIG. 1, a second strain relieving wire weave sleeve 64 is secured to the upper end of rod 52 to assist the sleeve 63 in resisting outward force on the cable when the two rod sections are threadably secured together.

As mentioned previously, the apparatus of the invention is capable of measuring the characteristics of a material by either the direct transmission technique or the back scattering technique with only a single detector and without requiring manipulation of the radioactive source. In order to provide the apparatus with this capability, it includes means for securing the detector at two different locations, a first one for taking back scattering measurements and a second one for taking direct transmission measurements. At the first location, the detector is shielded from the container opening so that substantially no direct radiation from the source within the container will be received by the detector, and at the second location the detector is in direct-line-of-sight with the container opening in order to receive radiation directly from the source. The means for securing the detector at a predetermined position for back scattering measurements comprises a bracket, generally referred to by the reference numeral 66, secured to housing 11 adjacent the lower end of end wall 19 by means of bolts 67. Bracket 66 is adapted to maintain the end section of the rod laterally adjacent the housing in generally parallel relationship to the housing bottom wall 14. More particularly, bracket 66 extends laterally along wall 19 and includes a body member 68 which defines a laterally extending recess 69 having an open side for the reception of the end section of the rod. Bracket body 68 includes a vertically extending rear wall 71 and a bottom wall 72 projecting horizontally outward therefrom. End walls 73 and 74 extending between the ends of rear wall 71 and bottom wall 72 define with walls 71 and 72, the recess 69. A spring clip 76 secured to rear wall 71 is provided for releasably maintaining the rod end section within such recess at a predetermined location. As slot 77 in end wall 73 extending inwardly from the open side of the recess provides means for exit from the recess of the cable 57 secured to the detector.

As illustrated in FIG. 3, with this arrangement end section 54 of rod 52 is completely received within the recess 69. Thus, such end section is substantially protected from the surrounding environment. For example, the threads on the end thereof for securing the end section to section 53 of the rod will be protected from dirt and damage. This protection is obtained even though rod section 54 is easily and simply insertable into and removable from recess 69. Spring clip 76 includes a portion curved to fit the outer surface of section 54 to maintain the section in position, and also includes an upwardly turned lip 78 facilitating the snapping of such section into the recess. To remove the end section from the recess, it need simply be pulled outwardly therefrom against the resilience of clip 76.

Side wall 19 also includes means for conveniently holding section 53 of the rod in a suitable location when the end section is positioned within the bracket 66. That is, a spring clip 79 is secured to side wall 19 at one of its upper corners by rivets 18. Clip 79 is angled generally toward the end wall 73 of bracket 66 for convenience and is adapted to hold section 53 with a snap fit.

The means for securing the detector at the second position for making measurements by the direct transmission method comprises a guide 82 secured to the side wall 18 of the housing. Guide 82 is adapted to maintain the detector rod in a generally perpendicular orientation relative to the bottom of the housing with the end section of the rod containing the detector below the bottom of such housing. More particularly, guide 82 is formed by a "U" shaped body secured to side wall 18 by means of bolts 83 extending through the rear wall of such body. The legs or ears 84 of the body are in vertical alignment and each has a circular hole coaxially aligned with the circular hole of the other for the reception of the detector rod, as illustrated in FIG. 1, to maintain such rod in the perpendicular orientation. Means are provided for releasably securing the rod at a coaxial position within the guide. For this purpose, rod 52 is provided with a plurality of circumferential grooves 86 spaced axially along its length, and a detent 87 is resiliently engageable with a selected one of such grooves to maintain the rod in a particular vertical position. Detent 87 comprises a leaf spring 88 projecting outwardly from between housing sidewall 18 and guide 82 and terminating at its upper end in an outwardly projecting flange 89 which is provided with a semi-circular cutout engageable within any selected one of the grooves 86 to maintain the rod 52 at a desired position.

The guide arrangement discussed above will enable the detector to be positioned at any one of a plurality of differing prescribed distances below the surface of a material being measured in accordance with conventional direct transmission methods. While because of their simplicity and ease of use the described bracket and guides structures provides preferable means for positioning the detector at the two different locations, it will be appreciated that other structure could be provided for the same purpose. For example, a single bracket could be used designed to move the detector between two locations or orientations or the detector could be positioned in slots or the like in the housing for the different locations.

To facilitate storage of detector rod 52, the underneath surface of the top wall of the cover 21 is provided with a pair of adjacent spring clips 91 adapted to receive and hold the rod sections 53 and 54. Thus, to store the rod when the apparatus is not being used, the rod section can be separated into the sections which, in turn, are securable within the covers by clips 91. While as shown and described, rod 52 is provided in two sections, it will be appreciated that it could be provided in only one section, or more than two sections, depending upon the particular requirements for its use.

To provide a compact, single unit apparatus, the housing also desirably encloses means for indicating the amount of radiation detected by detector 51 in either of its locations. FIG. 7 is a block diagram of a representative circuit for powering the detector and providing the desired readout. As illustrated, a power supply 101 is provided which desirably includes a battery pack contained within housing 12, as well as suitable circuit for enabling the apparatus to be operated by an external A.C. or D.C. voltage source. Such supply can also include means for charging the internal battery pack from an external supply. Supply 101 is connected through an on-off switch 102 to both a low voltage supply 103 for supplying the D.C. voltages voltages by the remainder of the circuitry and a high voltage supply 104 for providing the necessary polarizing potentials for a detector section 105. Besides such section 105 including a detector as described for measuring a characteristics such as density of the material by either the direct transmission or back scatter techniques described, it can also include other detectors for measuring other characteristics of the material. For example, if the external detector is for measuring the density of the material, the apparatus can also include a detector mounted internally of housing 12 for measuring the moisture content of the material.

When it is desired to determine the amount of radiation being received in the detector section, a double pole switch 106 is moved to the "count" position which will cause the low voltage supply 103 to activate a timer circuit 107. Upon activation, timer circuit 107 gates on high voltage supply 104 to thereby activate the detector in use. Timer 107 also activates a scaler 108 for counting the pulses issuing from the detector upon detection of radiation. The output of the detector section 105 passes through a channel selector 109 having different channels for density and moisture detectors. Selector 109 can also provide switching into the circuit of various internal checking circuits, etc. The signal from channel selector 109 is amplified in a preamplifier 110 where the detector pulses are conditioned to be in proper form to be counted by a scaler 108. Scaler 108 counts and stores the number of pulses received from detector section 105 in a predetermined time period set by timer 107. When it is desired to read out the stored information, switch 106 is moved to the "read" position and the scaler is energized by the low voltage supply to display the information on the readout 111 which can be a plurality of Nixie readout tubes. The read out information will indicate the amount of radiation which has been detected in a predetermined time period, and such information can be compared in a conventional manner with calibration curves to obtain the desired measurement of the characteristic of the material.

From the above it will be seen that the instant invention provides a compact apparatus capable of measuring the characteristics of a material both by the direct transmission and reflection of radiation technique. It accomplishes this in a simple manner and without requiring the manipulation of a radioactive source.

What is claimed is:

1. Apparatus for determining density and the like of a material either, selectively, by direct transmission of radiation therethrough from a source to a detector or by reflection of transmitted radiation from a surface layer of such material to a detector, comprising: a housing having side, end and bottom walls together defining a changer therewithin; a radiation-shielding container fixedly mounted within said chamber along said bottom wall for receipt of a radioactive source, and being provided with a downwardly facing radiation-transparent opening through which radiation from such source is transmitted downwardly through said bottom wall; radiation-shielding shutter means associated with said opening and being movable with respect thereto between open and closed positions; an elongated detector structure movable with respect to said housing exteriorly thereof and including a plurality of separable sections one of which at an end of said structure is equipped with a radiation detector, said sections being securable one to another in axial alignment and being angularly displaceable relative to each other when separated; and bracket means provided by said housing along the exterior thereof for supporting said detector structure in alternate positions of use, one such position requiring separation of said detector-equipped section and said bracket means being operative to releasably support the same adjacent said bottom wall in generally parallel relation with the plane thereof to receive radiation transmitted through said opening and reflected by a surface layer of such material, and the other such position requiring assembly of said detector-equipped section with other sections and said bracket means being operative to releasably support the same in a generally normal disposition relative to the plane of said bottom wall and projecting downwardly therefrom for insert into such material to receive radiation transmitted through said opening and through such material.

2. The apparatus of claim 1 in which said bracket means includes first and second brackets respectively corresponding to the aforesaid one and other positions of said detector structure and operative to releasably support the same therein, and in which said bracket means further includes a holder operative to releasably support the sections of said detector structure other than the detector-equipped section thereof whenever the latter is supported by said first bracket.

3. The apparatus of claim 2 and further comprising means having elements respectively provided by said detector structure and by said second bracket for supporting said detector structure selective at a plurality of vertical positions relative to said second bracket.

4. The apparatus of claim 3 in which said first bracket and holder are disposed along one end wall of said housing and said second bracket is disposed along the opposite end wall thereof.

5. The apparatus of claim 1 and further comprising means connected with the aforesaid radiation-shielding shutter means for opening and closing the same, said opening and closing means including a spring resiliently biasing said shutter toward the closed position thereof, an upwardly extending crank arm supported for angular displacements about the longitudinal axis thereof and being connected with said shutter for opening the same against the biasing force of said spring, a generally horizontally disposed handle for carrying said apparatus and being secured to said crank arm for angular displacements therewith, and a pair of spaced apart stop locks selectively engageable with said handle for releasably securing the same in positions respectively corresponding to the open and closed positions of said shutter, and means operatively associated with the stop latch corresponding to the open position of said shutter for automatically releasing said handle whenever an upward lifting force is applied thereto, whereby said spring is effective to displace said handle and crank and shutter to positions corresponding to the closed position of the latter to prevent radiation from being emitted when the apparatus is lifted.

6. The apparatus of claim 5 in which said bracket means includes first and second brackets respectively corresponding to the aforesaid one and other positions of said detector structure and operative to releasably support the same therein, and in which said bracket means further includes a holder operative to releasably support the sections of said detector structure other than the detector-equipped section thereof whenever the latter is supported by said first bracket.

* * * * *